United States Patent Office 3,484,484
Patented Dec. 16, 1969

3,484,484
NOVEL ALKYLAMINOPHENYL UREAS
Herbert Schwartz, 27 N. State St., Vineland, N.J. 08360, and Joseph B. Skaptason, 12700 Prospect Ave., Rte. 30, Kansas City, Mo. 64146
No Drawing. Filed Mar. 28, 1967, Ser. No. 626,409
Int. Cl. C07c 127/18
U.S. Cl. 260—553                                    9 Claims

ABSTRACT OF THE DISCLOSURE

Novel N-4-alkylaminophenyl ureas of the formula

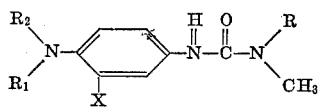

wherein R is selected from the group consisting of hydrogen and methyl, $R_1$ and $R_2$ are selected from the group consisting of hydrogen and alkyl of 1 to 6 carbon atoms with the proviso that the total number of carbon atoms in $R_1+R_2$ is at least 3 and X is selected from the group consisting of halogen such as chlorine, bromine or iodine, and trifluoromethyl, which are useful as selective herbicides.

PRIOR ART

Various substituted phenyl ureas, such as N-phenyl-N', N' - dimethyl urea, N - (4-chlorophenyl)-N',N'-dimethylurea, N - (3,4 - dichlorophenyl) - N',N'-dimethyl urea, N - (3 - trifluoromethyl-4-chlorophenyl) - N',N'-dimethyl urea, etc., are known to possess herbicidal activity. The known urea herbicides have various deficiencies such as lack of selective herbicidal activity for killing weeds in useful crops without injury to the crops on special application procedures or too high dosages which make them uneconomical.

OBJECTS OF THE INVENTION

It is an object of the invention to provide the novel N-(4-lower-alkylaminophenyl) ureas of Formula I.
It is another object of the invention to provide novel selective herbicidal compositions having a high degree of activity.
It is a further object of the invention to provide a novel method of killing weeds.
These and other objects and advantages of the invention will become obvious from the following detailed description.

THE INVENTION

The novel compounds of the invention have the formula

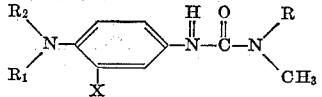

wherein R is selected from the group consisting of hydrogen and methyl, $R_1$ and $R_2$ are selected from the group consisting of hydrogen and alkyl of 1 to 6 carbon atoms with the proviso that the total number of carbon atoms in $R_1+R_2$ is at least 3 and X is selected from the group consisting of halogen and trifluoromethyl.

The compounds of the invention possess a high degree of selective pre- and post-emergence herbicidal activity and are useful at very low dosages, i.e., effective even at as low as 0.375 pound per acre. The total number of carbon atoms for the sum of $R_1$ and $R_2$ is critical for herbicidal activity. If the total is less than 3, such as with N - (3 - trifluoromethyl - 4-dimethylaminophenyl)-N',N'-dimethyl urea, the compounds are completely devoid of herbicidal activity.

The herbicidal compositions containing at least one compound of Formula I as the active ingredient may be in the form of dusting preparations, solutions, emulsions, dispersions, concentrates, etc.

In order to prepare a solution suitable for direct spraying, there may be used, for example, a mineral oil fraction of high or medium boiling range, such as diesel oil or kerosense, or coal tar oils, or vegetable or animal oils and also hydrocarbons such as alkylated naphthalenes, or tetrahydronaphthalene, if desired, with the use of xylene mixtures, cyclohexanols, ketones, or chlorinated hydrocarbons, such as tetrachloroethane, trichloroethylene or tri- or tetrachlorobenzenes.

Aqueous preparations suitable for application can be prepared by the addition of water to emulsifiable concentrates, pastes or wettable powders. As emulsifying or dispersing agents there may be used non-ionic products, for example, condensation products of ethyleneoxide with aliphatic alcohols, amines or carboxylic acids containing a hydrocarbon radical having about 10 to 30 carbon atoms, such as a condensation product of octadecyl alcohol with 25 to 30 molecular proportions of ethylene oxide, or of soya bean fatty acid with 30 molecular proportions of ethylene oxide or of commercial oleylamine with 15 molecular proportions of ethylene oxide or of dodecylmercaptan with 12 molecular proportions of ethyleneoxide. Among anion active emulsifying agents there may be mentioned the sodium salt of dodecyl alcohol sulfuric acid ester, the sodium salt of dodecyl-benzene sulfonic acid, the potassium or triethanolamine salt of oleic acid or abietic acid or of a mixture of these acids, or the sodium salt of petroleum sulfonic acid. As cation-active dispersing agents there may be used quaternary ammonium compounds, such as cetyl pyridinium bromide or di-(hydroxyethyl)-benzyl-dodecyl-ammonium chloride.

For making dusting or scattering preparations, there may be used as solid carriers talcum, kaolin, bentonite, atapulgite calcium carbonate or calcium phosphate or carbon, cork meal or wood meal or other materials of vegetable origin. The various preparations can be rendered more suitable for the various ways in which they are to be used by the addition of substances which improve the dispersion, adhesiveness, resistance to rain or penetration capacity of the compositions. As such substances, there may be mentioned fatty acids, resins, glue, casein, or for example, alginates or the like.

The said (N,N-alkylaminophenyl) urea herbicidal compositions can also contain herbicides containing an oxidizing ion to obtain synergistic herbicidal compositions. Examples of suitable herbicides containing oxidizing ions are dipyridylium salts such as 1,1'-ethylene-2,2'-dipyridylium dibromide, (Diquat), 1,1' - dimethyl-4,4'-dipyridylium di(methylsulfate), (Paraquat), etc.; alkali metal and alkaline earth metal nitrate salts such as sodium nitrate, calcium nitrate, etc.; herbicidal arsenical compounds such as monoalkanearsonic acids and lower dialkylarsinic acids such as methanearsonic acid, propanearsonic acid, dibutylarsinic acid, dipropylarsinic acid, cacodylic acid, (hydroxydimethylarsine oxide), etc.; and their alkali metal, alkaline earth metal and amine salts such as monosodium methanearsonate, (MSMA), disodium methanearsonate, (DSMA), calcium hydrogen methanearsonate, and amine salts of the said arsonic acid where the amine is ethanolamine, triethanolamine, isopropylamine, tri-isopropanolamine, mixture of alkylamines having 8 to 14 carbon atoms, etc.

The novel compounds of Formula I can be made by procedures known to those skilled in the art. For example, a 4-chloro-3-X-nitrobenzene where X has the definition of Formula I may be reacted with an amine of the formula

wherein $R_1$ and $R_2$ have the definition of Formula I to form the corresponding 3-X-4-$NR_1R_2$-nitrobenzene which can then be hydrogenated in the presence of a palladium-carbon catalyst to form the corresponding 3-X-4-$NR_1R_2$-aniline which can then be reacted with dimethylcarbamoyl chloride or methylisocyanate to form the corresponding N-(3-X-4-$NR_1R_2$-phenyl)-N'-methyl-N'-R-urea.

Examples of suitable compounds of Formula I are N-(3-trifluoromethyl - 4 - diethylaminophenyl)-N',N'-dimethyl urea; N-(3-chloro-4-diethylaminophenyl)-N',N'-dimethyl urea; N-(3 - trifluoromethyl-4-dipropylaminophenyl)-N',N'-dimethylurea; N - (3 - trifluoromethyl-4-dipropylaminophenyl) - N' - methylurea; N-(3-trifluoromethyl-4-dibutylaminophenyl)-N',-N'-dimethyl urea; N-(3-trifluoromethyl - 4 - tert.-butylaminophenyl)-N',N'-dimethyl urea; N - (3-trifluoromethyl-4-diisopropylamino-phenyl)-N',N'-dimethylurea; N - (3 - chloro-4-diethylaminophenyl)-N',N-dimethyl urea; N-(3-trifluoromethyl-4-methylethylaminophenyl)-N',N'-dimethyl urea, the corresponding 3-bromo and 3-iodo derivatives, etc.

The post-emergence herbicidal method of the invention for killing weeds comprises contacting the plants to be killed with a herbicidally effective amount of at least one compound of Formula I. Preferably the said compounds are in the form of emulsions or suspensions.

The pre-emergence herbicidal method of the invention for killing undesirable plants comprises applications to the soil before germination of undesired seeds a herbicidally effective amount of at least one compound of Formula I.

The usual herbicidally effective amount of the compounds will range from 0.25 to 100 pounds per acre. preferably 0.5 to 5 pounds per acre, depending upon the method of application.

In the following examples, there are described several preferred embodiments to illustrate the invention. However, it should be understood that the invention is not intended to be limited to the specific embodiments.

EXAMPLE I

Preparation of N(3-trifluoromethyl-4-dipropylaminophenyl)-N',N'-dimethyl urea

A mixture of 98 g. of 4-chloro-3-trifluoromethyl-nitrobenzene and 97 gm. of dipropylamine in 150 ml. of methanol was refluxed overnight. Then, one liter of water was added to the reaction mixture and the resulting solution was extracted three times with ether. The ether extracts were combined, washed with water, dried and the solvent distilled off to obtain 89 gm. of 3-trifluoromethyl-4-dipropylaminonitrobenzene having a boiling point of 86–89° C. at 0.5 mm. Hg. The said product was dissolved in ethyl acetate and hydrogenated with a palladium or carbon catalyst to 3-trifluoromethyl-4-dipropylamino-aniline having a boiling point of 85–88° C., at 1 mm. Hg.

14.5 g. of 3-trifluoromethyl-4-dipropylamino-aniline and 4.5 ml. of pyridine were dissolved in 150 ml. of benzene and then 6 g. of dimethylcarbamoyl chloride was added thereto at room temperature. After the reaction was completed, the pyridine hydrochloride precipitate was filtered off and the solution was evaporated to dryness. The residue was recrystallized from a mixture of benzene-hexane to obtain N-(3-trifluoromethyl-4-dipropylaminophenyl)-N',N'-dimethylurea having a melting point of 124–125° C.

EXAMPLE II

Preparation of N-(3-trifluoromethyl-4-diethylaminophenyl)N',N'-dimethylurea

Using the procedure of Example I, 67.6 gm. of 4-chloro-3-trifluoromethyl-nitrobenzene and 58.9 gm. of diethylamine were reacted in 300 ml. of methanol to obtain 55 g. of 3-trifluoromethyl-4-diethylamino-nitrobenzene having a boiling point of 95–98° C. at 1.0 mm. Hg. The latter was then reduced to obtain 3-trifluoromethyl-4-diethylamino-aniline which was then reacted with dimethylcarbamoyl chloride and pyridine to obtain N-(3-trifluoromethyl-4-diethylaminophenyl)-N',N'-dimethyl urea having a melting point of 133–134° C.

EXAMPLE III

Preparation of N-(3-chloro-4-dipropylaminophenyl)N', N'-dimethyl urea

Using the procedure of Example I, 96 g. of 1,2-dichloro-4-nitrobenzene and 111 g. of dipropylamine were reacted in 500 ml. of methanol to obtain 90 g. of 3-chloro-4-dipropylamino-nitrobenzene having a melting point of 41 to 43° C. Reduction of 51.2 g. of the said product gave 36 g. of 3-chloro-4-dipropylamino-aniline which was reacted with dimethylcarbamoyl chloride and triethylamine to form N-(3-chloro-4-dipropylaminophenyl)-N',N'-dimethyl urea having a melting point of 132–133° C.

EXAMPLE IV

Preparation of N-(3-trifluoromethyl-4-dipropylaminophenyl)N'-methylurea

Using the procedure of Example I, 4-chloro-3-trifluoromethyl-nitrobenzene was reacted with dipropylamine to form 3 - trifluoromethyl - 4 - dipropylamino - nitrobenzene which was reduced and then the reduction product was reacted with methylisocyanate to obtain N-(3-trifluoromethyl-4-dipropylamino-phenyl)N'-methylurea having a melting point of 99 to 102° C.

EXAMPLE V

Preparation of N-(3-trifluoromethyl-4-dibutylaminophenyl)N',N'-dimethylurea

Using the procedure of Example I, 4-chloro-3-trifluoromethyl-nitrobenzene was reacted with dibutylamine to form 3-trifluoromethyl-4-dibutylamino-nitrobenzene which was reduced and reacted with dimethylcarbamoyl chloride to obtain N-(3-trifluoromethyl-4-dibutylaminophenyl)N',N'-dimethylurea having a melting point of 166–168° C.

EXAMPLE VI

Preparation of N-(3-trifluoromethyl-4-tert.butylaminophenyl)N',N'-dimethylurea

Using the procedure of Example I, 4-chloro-3-trifluoromethyl-nitrobenzene was reacted with tert.-butylamine to form 3 - trifluoromethyl - 4 - tert.butylamino - nitrobenzene which was reduced and reacted with dimethylcarbamoyl chloride to form N-(3-trifluoromethyl-4-tert.butylaminophenyl)N',N'-dimethylurea having a melting point of 115–118° C.

EXAMPLE VII

Preparation of N-(3-trifluoromethyl-4-diisopropylaminophenyl)N',N'-dimethylurea

Using the procedure of Example I, 4-chloro-3-trifluoromethyl-nitrobenzene was reacted with diisopropylamine to form 3 - trifluoromethyl - 4 - diisopropylamino - nitrobenzene which was reduced and reacted with dimethylcarbamoyl chloride to form N-(3-trifluoromethyl-4-diisopropylaminophenyl)N',N' - dimethylurea having a melting point of 110–112° C,

EXAMPLE VIII

Preparation of N-(3-chloro-4-diethylaminophenyl)-N',N'-dimethylurea

Using the procedure of Example I, 3,4-dichloro-nitrobenzene was reacted with diethylamine to form 3-chloro-4-diethylamino-nitrobenzene which was reduced and reacted with dimethylcarbamoyl chloride to form N-(3-chloro - 4 - diethylaminophenyl)N',N' - dimethylurea having a melting point of 137–139° C.

EXAMPLE IX.—POST-EMERGENCE HERBICIDAL ACTIVITY

To demonstrate the herbicidal activity of N-(4-alkylaminophenyl) ureas of the invention, the said compounds were applied to a series of different types of plants according to the following procedure:

The compounds were prepared as 10% emulsion concentrates in the following solvent system.

Formula F:                                      Percent by wt.
  Velsicol AR–50 _____ 50
  Triton X–161 _____ 10
  Diethyleneglycol monobutylether acetate ____ 40

Triton X–161 is a blend of anionic and non-ionic alkyl aryl polyether alcohols and organic sulfonates. Velsicol AR–50 is a mixture of methylated naphthalenes.

The crops to be used in the test had been planted in flats 10 to 12 days before the tests and were well established seedlings. The plants were sprayed by a continuous belt method by which the active compounds were applied to each flat containing the test crops at varying dosages. The plants were then kept under constant daily surveillance for a period of 7 to 14 days. The final phytotoxicity data was recorded at the end of 14 days and the plants were scored for phytotoxicity ratings on a scale from 0 (no injury to plants) to 10 (all the plants were killed). The results of the tests are summarized in Table I.

carbon atoms in the 4-amino grouping as the dimethylamino compound is inactive.

EXAMPLE X.—PRE-EMERGENCE HERBICIDAL ACTIVITY

Flats, (11 x 13 inches), were planted of the desired crops to a depth of approximately one-half inch. The soil used was always of a consistent composition and great care was taken in planting individual flats, not only daily but from test to test in order to obtain consistency and uniformity of the flats at all times. Care was also exercised not only in retaining a consistent and uniform lot of seeds, but always also carefully counted out in order to get accurate percentage emergence values. In other words, every thing was done to assure uniformity of testing methods month to month. Since all of this work was conducted in the greenhouse, the only factor difficult to control was that of temperature.

The chemicals were tested at varying dosage rates of active ingredient per acre and were prepared as 50% wettable powders, using a "pre-mix" preparation as the inert ingredient. The pre-mix had the following composition:

Percent
Hi Sil 232 _____ 92
Marasperse N _____ 4
Pluronic L61 _____ 4

The method of application was actually a drench method. The required amount of chemical was suspended in 250 ml. of water and this quantity of wettable powder suspension was uniformly distributed over each flat. The flats were immediately transferred to the greenhouse and covered for a period of 3 days so that additional watering was not required until most of the plants had begun to make their appearance above ground. When it was assured that all emergence had occurred, a stand count was

TABLE I.—POST-EMERGENCE HERBICIDAL EVALUATION

| Compound | Dose, lb./AC | Tomato | Radish | Cuks | Red kidney bean | Soy bean | Cotton | Pig-weed | Setaria | Johnson Grass Small | Johnson Grass Med. | Johnson Grass Lge. | Oats | Wheat | Rice |
|---|---|---|---|---|---|---|---|---|---|---|---|---|---|---|---|
| 1,1-dimethyl 1-3-(4-dipropylamino-3-trifluoromethylphenyl)urea. | 1.5 | 10 | 10 | 10 | 10 | 10 | 3Y | 10 | 10 | 10 | 10 | 8 | 9 | 5 | 4 |
|  | 0.75 | 10 | 01 | 10 | 10 | 10 | 0 | 9 | 10 | 10 | 10 | 6 | 8 | 4 | 3 |
|  | 0.375 | 10 | 10 | 10 | 10 | 10 | 1Y | 10 | 10 | 8 | 10 | 4 | 5 | 0 | 6 |
| N',N-dimethyl-N-(4-dimethylamino-3-trifluoromethylphenyl)urea | 2 | 1 | 1 | 1 | 1 | 2 | 0 | 0 | 0 | 0 | 0 | 0 | 0 | 0 | 0 |
| N',N'-dimethyl-N-(4-diethylamino-3-trifluoromethyl phenyl) urea. | 1.5 | 10 | 10 | 10 | 6 | 8 | 3 | 10 | 10 | 10 | 10 | 8 | 7 | 7 | 1 |
|  | 0.75 | 10 | 10 | 10 | 6 | 9 | 0–1 | 10 | 10 | 10 | 10 | 9 | 5 | 2 | 0 |
|  | 0.375 | 10 | 9 | 10 | 6 | 10 | 0–1 | 9 | 9 | 10 | 9 | 9+ | 4 | 2 | 0 |
| N',N'-dimethyl-N-(4-diethylamino-3-chlorophenyl)urea. | 1.5 | 10 | 10 | 10 | 10 | 10 | 9 | 10 | 9+ | 9+ | 5 | 5 | 0 | 0 | 2 |
|  | 0.75 | 10 | 10 | 10 | 10 | 10 | 1 | 10 | 10 | 10 | 6 | 6 | 0 | 0 | 1 |
|  | 0.375 | 10 | 10 | 10 | 10 | 9 | 0 | 10 | 10 | 7 | 4 | 5 | 0 | 0 | 0 |
| N-methyl-N-(4-dipropylamino-3-trifluoro-methylphenyl) urea. | 1.5 | 10 | 10 | 10 | 7Y | 6 | 2 | 9 | 10 | 10 | 6 | 3 | 4 | 4 | 7 |
|  | 0.75 | 10 | 10 | 10 | 7 | 6 | 1 | 7 | 8 | 9 | 5 | 4 | 4 | 3 | 1 |
|  | 0.375 | 10 | 10 | 10 | 4Y | 5Y | 1 | 5 | 4 | 6 | 4 | 2 | 3 | 2 | 1 |
| N',N'-dimethyl-N-(4-dibutylamino-3-trifluoro-methylphenyl)urea. | 1.5 | 10 | 10 | 10 | 8Y | 10 | 3 | 10 | 10 | 10 | 8 | 6 | 6 | 4 | 4 |
|  | 0.75 | 10 | 10 | 10 | 9Y | 9Y | 0–1 | 10 | 9 | 9 | 7 | 6 | 3 | 5 | 4 |
|  | 0.375 | 10 | 10 | 10 | 8Y | 8 | 2 | 9 | 9 | 7 | 5 | 4 | 3 | 3 | 2 |
| Cotoran | 1.5 | 9 | 9 | 8 | 3B | 5YB | 0 | 8 | 6 | 1 | 0 | 0 | 0 | 0 | 1 |
|  | 0.75 | 9 | 9 | 8 | 3YB | 3Y | 0 | 6 | 3 | 0 | 0 | 0 | 0 | 0 | 0 |
|  | 0.375 | 6 | 6 | 6 | 3YB | 1Y | 0 | 4 | 3 | 2 | 0 | 0 | 0 | 0 | 0 |
| Diuron | 1.5 | 10 | 10 | 10 | 7 | 10 | 2Y | 10 | 10 | ____ | 9 | 8 | 4 | 3 | 3 |
|  | 0.75 | 9 | 10 | 10 | 6 | 7 | 1Y | 9 | 10 | 7 | 6 | 4 | 2 | 1 | 2 |
|  | 0.375 | 7 | 8 | 9 | 4 | 7 | 1Y | 7 | 7 | 1 | 1 | 1 | 1 | 1 | 2 |
| Check | 0 | 0 | 0 | 0 | 0 | 0 | 0 | 0 | 0 | 0 | 0 | 0 | 0 | 0 | 0 |

Y—Yellowing.   B—Blanching.

The results of Table I clearly show that the (4-alkylaminophenyl)ureas of the invention have a higher herbicidal activity and/or a wider range of selectivity than Cotoron [N-(3'-trifluoromethyl-4-chlorophenyl) N',N'-dimethyl urea] and Karmex [N-3,4-dichlorophenyl]-N',N'-dimethyl urea] and the criticality of the number of made. Normally the flats are ready for phytotoxicity rating at the end of 14 to 16 days.

The phytotoxicity ratings (PR value) were based upon a scoring system of 0 to 10 in which 0 indicates no injury, to the other extreme, where 10 indicates that the plants were killed. The results are shown in Table II.

TABLE II

| Compound | Dose lb./AC | Emerg. P.R. | Pigweed | Tomato | Radish | Setaria | J. Grass | Cats |
|---|---|---|---|---|---|---|---|---|
| N-(3-trifluoro-methyl-4-dipropylaminophenyl) N',N'-dimethyl urea. | 5 | Emerg. PR | 0 | 0 | 20 | 0 | 0 | 40 |
| | | | 10 | 10 | 10 | 10 | 10 | 10 |
| | 2½ | Emerg. PR | 0 | 0 | 30 | 40 | 30 | 30 |
| | | | 10 | 10 | 9 | 9+ | 8 | 9+ |
| | 1¼ | Emerg. PR | 0 | 0 | 40 | 40 | 20 | 40 |
| | | | 10 | 10 | 7 | 9 | 9 | 8 |
| | 0.62 | Emerg. PR | 0 | 20 | 65 | 50 | 60 | 80 |
| | | | 10 | 9 | 2 | 5 | 4 | 4 |
| N-(3-trifluoromethyl-4-diethylaminophenyl)N', N'-dimethyl urea. | 5 | Emerg. PR | 0 | 20 | 50 | 30 | 20 | 50 |
| | | | 10 | 10 | 9 | 10 | 9 | 10 |
| | | | 10 | 10 | 9 | 10 | 9 | 10 |
| | 2½ | Emerg. PR | 0 | 30 | 50 | 50 | 50 | 50 |
| | | | 10 | 10 | 9+ | 9+ | 7 | 9+ |
| | 1¼ | Emerg. PR | 0 | 40 | 65 | 60 | 40 | 60 |
| | | | 10 | 9 | 5 | 6 | 8 | 7 |
| | 0.62 | Emerg. PR | 0 | 30 | 65 | 70 | 30 | 70 |
| | | | 10 | 9 | 4 | 5 | 5 | 3 |
| N-(3-chloro-4-dipropylaminophenyl) N',N'-dimethylurea. | 5 | Emerg. PR | 0 | 30 | 30 | 40 | 30 | 50 |
| | | | 10 | 10 | 9+ | 8 | 8 | 7 |
| | 2½ | Emerg. PR | 0 | 20 | 50 | 50 | 20 | 50 |
| | | | 10 | 9 | 7 | 7 | 7 | 7 |
| | 1¼ | Emerg. PR | 0 | 40 | 65 | 65 | 30 | 60 |
| | | | 10 | 6 | 5 | 4 | 7 | 4 |
| | 0.62 | Emerg. PR | 0 | 60 | 65 | 65 | 20 | 80 |
| | | | 10 | 4 | 3 | 4 | 7 | 3 |
| N-(3-trifluoromethyl-4-di-butylaminophenyl) N',N'-dimethylurea. | 5 | Emerg. PR | 0 | 20 | 40 | 40 | 20 | 40 |
| | | | 10 | 10 | 9 | 8 | 9+ | 9 |
| | 2½ | Emerg. PR | 0 | 30 | 50 | 40 | 30 | 50 |
| | | | 10 | 8 | 5 | 7 | 7 | 7 |
| | 1¼ | Emerg. PR | 0 | 40 | 65 | 65 | 60 | 60 |
| | | | 10 | 9 | 4 | 7 | 4 | 4 |
| | 0.62 | Emerg. PR | 10 | 65 | 65 | 65 | 65 | 80 |
| | | | 9 | 0 | 3 | 2 | 2 | 2 |
| N-(3-tri-fluoromethyl-4-dipropyl-aminophenyl) N'N',methylurea. | 5 | Emerg. PR | 0 | 30 | 40 | 50 | 50 | 60 |
| | | | 10 | 7 | 6 | 5 | 4 | 4 |
| | 2½ | Emerg. PR | 0 | 40 | 70 | 70 | 65 | 85 |
| | | | 10 | 5 | 4 | 0 | 0 | 2 |
| | 1¼ | Emerg. PR | 10 | 70 | 80 | 65 | 65 | 85 |
| | | | 10 | 2 | 2 | 0 | 0 | 0 |
| | 0.62 | Emerg. PR | 20 | 80 | 80 | 70 | 65 | 85 |
| | | | 9 | 1 | 0 | 0 | 0 | 0 |
| N-(3-trifluoromethyl-4-dimethylaminopropyl) N',N'-dimethyl urea. | 5 | Emerg. PR | 60 | 85 | 75 | 75 | 65 | 85 |
| | | | 2 | 2 | 3 | 0 | 2 | 1 |
| | 2½ | Emerg. PR | 65 | 80 | 80 | 75 | 65 | 85 |
| | | | 0 | 0 | 0 | 0 | 0 | 0 |
| | 1¼ | Emerg. PR | 65 | 80 | 80 | 75 | 65 | 85 |
| | | | 0 | 0 | 0 | 0 | 0 | 0 |
| | 0.62 | Emerg. PR | 65 | 80 | 80 | 75 | 65 | 85 |
| | | | 0 | 0 | 0 | 0 | 0 | 0 |
| Cotoron | 5 | Emerg. PR | 0 | 40 | 40 | 50 | 20 | 40 |
| | | | 10 | 10 | 9 | 10 | 9 | 8 |
| | 2½ | Emerg. PR | 10 | 40 | 40 | 60 | 50 | 50 |
| | | | 10 | 9 | 9 | 9 | 7 | 8 |
| | 1¼ | Emerg. PR | 10 | 40 | 50 | 50 | 60 | 70 |
| | | | 9 | 9 | 6 | 7 | 5 | 5 |
| | 0.62 | Emerg. PR | 20 | 40 | 60 | 60 | 40 | 80 |
| | | | 9 | 9 | 5 | 5 | 3 | 4 |
| Diuron | 5 | Emerg. PR | 0 | 10 | 10 | 20 | 20 | 30 |
| | | | 10 | 10 | 9 | 10 | 9 | 9 |
| | 2½ | Emerg. PR | 0 | 30 | 50 | 60 | 50 | 80 |
| | | | 10 | 9 | 5 | 6 | 5 | 4 |
| | 1¼ | Emerg. PR | 10 | 30 | 40 | 50 | 50 | 80 |
| | | | 9 | 5 | 4 | 4 | 4 | 2 |
| | 0.62 | Emerg. PR | 10 | 80 | 80 | 70 | 65 | 85 |
| | | | 8 | 2 | 0 | 1 | 1 | 0 |
| Check | | | 65 | 80 | 70 | 75 | 65 | 85 |

Table II also shows the superior pre-emergence herbicidal activity of the compounds of the present invention as compared to Diuron and Cotoron and the criticality of the total of carbon atoms in $R_1$ and $R_2$.

What we claim is:

1. A compound of the formula

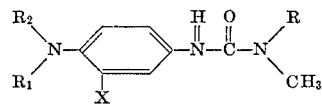

wherein R is selected from the group consisting of hydrogen and methyl, $R_1$ and $R_2$ are selected from the group consisting of hydrogen and alkyl of 1 to 6 carbon atoms with the proviso that the total number of carbon atoms in $R_1+R_2$ is at least 3 and X is selected from the group consisting of halogen and trifluoromethyl.

2. A compound of claim 1 which is N-(3-trifluoromethyl-4-dipropylaminophenyl)-N',N'-dimethyl urea.

3. A compound of claim 1 which is N-(3-trifluoromethyl-4-diethylaminophenyl)-N',N'-dimethyl urea.

4. A compound of claim 1 which is N-(3-trifluoromethyl-4-dipropylaminophenyl)-N'-methylurea.

5. A compound of claim 1 which is N-(3-trifluoromethyl-4-dibutylaminophenyl)-N',N'-dimethyl urea.

6. A compound of claim 1 which is N-(3-chloro-4-dipropylaminophenyl)-N',N'-dimethyl urea.

7. A compound of claim 1 which is N-(3-trifluoromethyl-4-tert.butylaminophenyl)-N',N'-dimethyl urea.

8. A compound of claim 1 which is N-(3-trifluoromethyl-4-diisopropylaminophenyl)-N',N'-dimethyl urea.

9. A compound of claim 1 which is N-(3-chloro-4-diethylaminophenyl)-N',N'-dimethyl urea.

References Cited

UNITED STATES PATENTS 3,138,571   6/1964   Popoff.

LEON ZITVER, Primary Examiner

M. W. GLYNN, Assistant Examiner

U.S. Cl. X.R.

71—120

UNITED STATES PATENT OFFICE
Certificate of Correction

Patent No. 3,484,484                                          December 16, 1969

Herbert Schwartz et al.

It is certified that error appears in the above-identified patent and that said Letters Patent are hereby corrected as shown below.

Column 3, line 26, "N'N-dimethyl" should read —N',N'-dimethyl—; line 41, "5" should read —15—. Tables I and II should appear as shown below:

TABLE I.—POST-EMERGENCE HERBICIDAL EVALUATION

| Compound | Dose, #/AC | Tomato | Radish | Cuks | Red kidney bean | Soy bean | Cotton | Pigweed | Setaria | Johnson Grass Small | Johnson Grass Med. | Johnson Grass Lge. | Oats | Wheat | Rice |
|---|---|---|---|---|---|---|---|---|---|---|---|---|---|---|---|
| 1,1-dimethyl 1-3-(4-dipropylamino-3-trifluoro methyl-phenyl)urea | 1.5 | 10 | 10 | 10 | 10 | 10 | 3Y | 10 | 10 | 10 | 10 | 8 | 9 | 5 | 4 |
| | 0.75 | 10 | 10 | 10 | 10 | 10 | 0 | 9 | 10 | 10 | 10 | 6 | 8 | 4 | 3 |
| | 0.375 | 10 | 10 | 10 | 10 | 10 | 1Y | 10 | 10 | 8 | 10 | 4 | 5 | 0 | 6 |
| N',N'-dimethyl-N-(4-dimethylamino-3-trifluoro methylphenyl)urea | 2 | 1 | 1 | 1 | 1 | 2 | 0 | 0 | 0 | 0 | 0 | 0 | 0 | 0 | 0 |
| N',N'-dimethyl-N-(4-diethylamino-3-trifluoro methyl phenyl) urea | 1.5 | 10 | 10 | 10 | 6 | 8 | 3 | 10 | 10 | 10 | 10 | 8 | 7 | 7 | 1 |
| | 0.75 | 10 | 10 | 10 | 6 | 9 | 0-1 | 10 | 10 | 10 | 10 | 9 | 5 | 2 | 0 |
| | 0.375 | 10 | 9 | 10 | 6 | 10 | 0-1 | 9 | 9 | 10 | 9 | 9+ | 4 | 2 | 0 |
| N'-N'-dimethyl-N-(4-diethylamino-3-chlorophenyl) urea | 1.5 | 10 | 10 | 10 | 10 | 10 | 9 | 10 | 9+ | 9+ | 5 | 5 | 0 | 0 | 2 |
| | 0.75 | 10 | 10 | 10 | 10 | 10 | 1 | 10 | 10 | 10 | 6 | 6 | 0 | 0 | 1 |
| | 0.375 | 10 | 10 | 10 | 10 | 9 | 0 | 10 | 10 | 7 | 4 | 5 | 0 | 0 | 0 |
| N-methyl-N-(4-dipropyl amino-3-trifluoro-methylphenyl) urea | 1.5 | 10 | 10 | 10 | 7Y | 6 | 2 | 9 | 10 | 10 | 6 | 3 | 4 | 4 | 7 |
| | 0.75 | 10 | 10 | 10 | 7 | 6 | 1 | 7 | 8 | 9 | 5 | 4 | 4 | 3 | 1 |
| | 0.375 | 10 | 10 | 10 | 4Y | 5Y | 1 | 5 | 4 | 6 | 4 | 2 | 3 | 2 | 1 |
| N',N',-dimethyl-N-(4-dibutylamino-3-trifluoro-methylphenyl) urea | 1.5 | 10 | 10 | 10 | 8Y | 10 | 3 | 10 | 10 | 10 | 10 | 8 | 6 | 4 | 4 |
| | 0.75 | 10 | 10 | 10 | 9Y | 9Y | 0-1 | 10 | 9 | 9 | 7 | 6 | 3 | 5 | 4 |
| | 0.375 | 10 | 10 | 10 | 8Y | 8 | 2 | 9 | 9 | 9 | 7 | 5 | 4 | 3 | 2 |
| Cotoran | 1.5 | 9 | 9 | 8 | 3B | 5YB | 0 | 8 | 6 | 1 | 0 | 0 | 0 | 0 | 1 |
| | 0.75 | 9 | 9 | 8 | 3YB | 3Y | 0 | 6 | 3 | 0 | 0 | 0 | 0 | 0 | 0 |
| | 0.375 | 6 | 6 | 6 | 3YB | 1Y | 0 | 4 | 3 | 2 | 0 | 0 | 0 | 0 | 0 |
| Diuron | 1.5 | 10 | 10 | 10 | 7 | 10 | 2Y | 10 | 10 | | 9 | 8 | 4 | 3 | 3 |
| | 0.75 | 9 | 10 | 10 | 6 | 7 | 1Y | 9 | 10 | 7 | 6 | 4 | 2 | 1 | 2 |
| | 0.375 | 7 | 8 | 9 | 4 | 7 | 1Y | 7 | 7 | 1 | 1 | 1 | 1 | 1 | 2 |
| Check | | 0 | 0 | 0 | 0 | 0 | 0 | 0 | 0 | 0 | 0 | 0 | 0 | 0 | 0 |

Y = Yellowing.    B = Blanching.

TABLE II

| Compound | Dose #/AC | Emerg. P.R. | Pigweed | Tomato | Radish | Setaria | J. Grass | Oats |
|---|---|---|---|---|---|---|---|---|
| N-(3-trifluoro-methyl-4-dipropylaminophenyl)N',N'-dimethyl urea. | 5 | Em | 0 | 0 | 20 | 0 | 0 | 40 |
| | | PR | 10 | 10 | 10 | 10 | 10 | 10 |
| | 2½ | Em | 0 | 0 | 30 | 40 | 30 | 30 |
| | | PR | 10 | 10 | 9 | 9+ | 8 | 9+ |
| | 1¼ | Em | 0 | 0 | 40 | 40 | 20 | 40 |
| | | PR | 10 | 10 | 7 | 9 | 9 | 8 |
| | 0.62 | Em | 0 | 20 | 65 | 50 | 60 | 80 |
| | | PR | 10 | 9 | 2 | 5 | 4 | 4 |
| N-(3-trifluoromethyl-4-diethylaminophenyl)N',N'-dimethylurea. | 5 | Em | 0 | 20 | 50 | 30 | 20 | 50 |
| | | PR | 10 | 10 | 9 | 10 | 9 | 10 |
| | 2½ | Em | 0 | 30 | 50 | 50 | 50 | 50 |
| | | PR | 10 | 10 | 9+ | 9+ | 7 | 9+ |
| | 1¼ | Em | 0 | 40 | 65 | 60 | 40 | 60 |
| | | PR | 10 | 9 | 5 | 6 | 8 | 7 |
| | 0.62 | Em | 0 | 30 | 65 | 70 | 30 | 70 |
| | | PR | 10 | 9 | 4 | 5 | 5 | 3 |
| N-(3-chloro-4-dipropylaminophenyl)N',N'-dimethylurea. | 5 | Em | 0 | 30 | 30 | 40 | 30 | 50 |
| | | PR | 10 | 10 | 9+ | 8 | 8 | 7 |
| | 2½ | Em | 0 | 20 | 50 | 50 | 20 | 50 |
| | | PR | 10 | 9 | 7 | 7 | 7 | 7 |
| | 1¼ | Em | 0 | 40 | 65 | 65 | 30 | 60 |
| | | PR | 10 | 6 | 5 | 4 | 7 | 4 |
| | 0.62 | Em | 0 | 60 | 65 | 65 | 20 | 80 |
| | | PR | 10 | 4 | 3 | 4 | 7 | 3 |
| N-(3-trifluoromethyl-4-dibutylaminophenyl)N',N'-dimethylurea. | 5 | Em | 0 | 20 | 40 | 40 | 20 | 40 |
| | | PR | 10 | 10 | 9 | 8 | 9+ | 9 |
| | 2½ | Em | 0 | 30 | 50 | 40 | 30 | 50 |
| | | PR | 10 | 8 | 5 | 7 | 7 | 7 |
| | 1¼ | Em | 0 | 40 | 65 | 65 | 60 | 60 |
| | | PR | 10 | 9 | 4 | 7 | 4 | 4 |
| | 0.62 | Em | 10 | 65 | 65 | 65 | 65 | 80 |
| | | PR | 9 | 0 | 3 | 2 | 2 | 2 |
| N-(3-trifluoromethyl-4-dipropylaminophenyl)N',-methylurea. | 5 | Em | 0 | 30 | 40 | 50 | 50 | 60 |
| | | PR | 10 | 7 | 6 | 5 | 4 | 4 |
| | 2½ | Em | 0 | 40 | 70 | 70 | 65 | 85 |
| | | PR | 10 | 5 | 4 | 0 | 0 | 2 |
| | 1¼ | Em | 10 | 70 | 80 | 65 | 65 | 85 |
| | | PR | 10 | 2 | 2 | 0 | 0 | 0 |
| | 0.62 | Em | 20 | 80 | 80 | 70 | 65 | 85 |
| | | PR | 9 | 1 | 0 | 0 | 0 | 0 |

TABLE II—Continued

| Compound | Dose #AC | Emerg. P.R. | Pigweed | Tomato | Radish | Setaria | J. Grass | Oats |
|---|---|---|---|---|---|---|---|---|
| N-(3-trifluoro-methyl-4-dimethylaminopropyl)N',N'-dimethylurea. | 5 | Em | 60 | 85 | 75 | 75 | 65 | 85 |
| | | PR | 2 | 3 | 3 | 0 | 2 | 1 |
| | 2½ | Em | 65 | 80 | 80 | 75 | 65 | 85 |
| | | PR | 0 | 0 | 0 | 0 | 0 | 0 |
| | 1¼ | Em | 65 | 80 | 80 | 75 | 65 | 85 |
| | | PR | 0 | 0 | 0 | 0 | 0 | 0 |
| | 0.62 | Em | 65 | 80 | 80 | 75 | 65 | 85 |
| | | PR | 0 | 0 | 0 | 0 | 0 | 0 |
| Cotoron | 5 | Em | 0 | 40 | 40 | 50 | 20 | 40 |
| | | PR | 10 | 10 | 9 | 10 | 9 | 8 |
| | 2½ | Em | 10 | 40 | 40 | 60 | 50 | 50 |
| | | PR | 10 | 9 | 9 | 9 | 7 | 8 |
| | 1¼ | Em | 10 | 40 | 50 | 50 | 60 | 70 |
| | | PR | 9 | 9 | 6 | 7 | 5 | 5 |
| | 0.62 | Em | 20 | 40 | 60 | 60 | 40 | 80 |
| | | PR | 9 | 9 | 5 | 5 | 3 | 4 |
| Diuron | 5 | Em | 0 | 10 | 10 | 20 | 20 | 30 |
| | | PR | 10 | 10 | 9 | 10 | 9 | 9 |
| | 2½ | Em | 0 | 30 | 50 | 60 | 50 | 80 |
| | | PR | 10 | 9 | 5 | 6 | 5 | 4 |
| | 1¼ | Em | 10 | 30 | 40 | 50 | 50 | 80 |
| | | PR | 9 | 5 | 4 | 4 | 4 | 2 |
| | 0.62 | Em | 10 | 80 | 80 | 70 | 65 | 85 |
| | | PR | 8 | 2 | 0 | 1 | 1 | 0 |
| Check | | | 65 | 80 | 70 | 75 | 65 | 85 |

Signed and sealed this 29th day of February 1972.

[SEAL]

Attest:
EDWARD M. FLETCHER, JR.,
*Attesting Officer.*

ROBERT GOTTSCHALK,
*Commissioner of Patents.*